(12) United States Patent
Taghibakhsh et al.

(10) Patent No.: US 8,993,971 B2
(45) Date of Patent: Mar. 31, 2015

(54) HIGH RESOLUTION POSITRON EMISSION TOMOGRAPHY

(75) Inventors: Farhad Taghibakhsh, Redwood City, CA (US); Craig Steven Levin, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 72 days.

(21) Appl. No.: 13/523,293

(22) Filed: Jun. 14, 2012

(65) Prior Publication Data

US 2012/0318988 A1    Dec. 20, 2012

Related U.S. Application Data

(60) Provisional application No. 61/497,219, filed on Jun. 15, 2011.

(51) Int. Cl.
| | | |
|---|---|---|
| *G01T 1/164* | (2006.01) | |
| *G01T 1/20* | (2006.01) | |
| *G01T 1/29* | (2006.01) | |
| *G01T 1/17* | (2006.01) | |

(52) U.S. Cl.
CPC ............. *G01T 1/2985* (2013.01); *G01T 1/17* (2013.01)
USPC ...................................... 250/363.03; 250/362

(58) Field of Classification Search
USPC .............................................. 250/362, 363.03
See application file for complete search history.

(56) References Cited

U.S. PATENT DOCUMENTS

| | | | |
|---|---|---|---|
| 4,843,245 A | | 6/1989 | Lecomte |
| 5,122,667 A | | 6/1992 | Thompson |
| 5,349,191 A | | 9/1994 | Rogers |
| 5,635,720 A | * | 6/1997 | Mooney et al. ............... 250/397 |
| 5,841,140 A | * | 11/1998 | Mc Croskey et al. ..... 250/363.04 |
| 6,114,703 A | * | 9/2000 | Levin et al. .................... 250/367 |
| 7,157,014 B1 | * | 1/2007 | Andreaco et al. ............... 216/24 |
| 8,084,742 B1 | * | 12/2011 | Nagarkar .................. 250/363.03 |
| 2003/0160185 A1 | * | 8/2003 | Homme ...................... 250/483.1 |
| 2010/0044571 A1 | * | 2/2010 | Miyaoka et al. .............. 250/362 |
| 2010/0127178 A1 | * | 5/2010 | Laurence et al. ........ 250/363.04 |

OTHER PUBLICATIONS

Du et al., Performance Study of Neural Network Position Estimators for the Monolithic Scintillator PET detector Modules, Nov. 2010, Nuclear Science Symposium Conference Record (NSS/MIC), 2010 IEEE, conference held Oct. 30, 2010-Nov. 6, 2010 in Knoxville, TN, p. 1-4.*
Miller et al., Singl-photon spatial and energy resolution enhancement of a columnar CsI(TI)/EMCCD gamma-camera using maximum-likelihood estimation, Mar. 2006, Proceedings of SPIE, vol. 6142, pp. 61421T-1-61421T-10.*

* cited by examiner

*Primary Examiner* — David Porta
*Assistant Examiner* — Jeremy S Valentiner
(74) *Attorney, Agent, or Firm* — Beyer Law Group LLP (57) ABSTRACT

A method for extracting photon depth of interaction information in a positron emission tomography system is provided. A pulse is detected in a photodetector. A height of the pulse is measured. A determination of whether the pulse height is within a set range is made. Photon depth of interaction is extracted from the pulse height. An energy of interaction is calculated from the pulse height and calibration data. The extracted photon depth and calculated energy spectrum are used in image reconstruction.

12 Claims, 11 Drawing Sheets

Model detectors & phantom for
GRAY simulation

Phantom  　　　Without DOI　　Single-ended
(9×20μCi)　　　　　　　　　　　　DOI

HIGH RESOLUTION POSITRON EMISSION TOMOGRAPHY

CROSS REFERENCE TO RELATED APPLICATIONS

This application claims priority under 35 U.S.C. §119 from U.S. Provisional Patent Application No. 61/497,219, filed Jun. 15, 2011, entitled METHODS OF EXTRACTING PHOTON DEPTH OF INTERACTION FOR HIGH RESOLUTION RADIATION IMAGING DETECTORS AND SYSTEMS, which is incorporated herein by reference for all purposes.

BACKGROUND OF THE INVENTION

This invention relates generally to positron emission tomography (PET).

SUMMARY OF THE INVENTION

In accordance with the invention, a method for extracting photon depth of interaction information in a positron emission tomography system is provided. A pulse is detected in a photodetector. A height of the pulse is measured. A determination of whether the pulse height is within a set range is made. Photon depth of interaction is extracted from the pulse height. An energy of interaction is calculated from the pulse height and calibration data. The extracted photon depth and calculated energy spectrum are used in image reconstruction.

In another manifestation of the invention, a method for extracting photon depth of interaction information in a positron emission tomography system is provided. A pulse is detected in a photodetector. A height of the pulse is measured. A determination is made of whether the pulse height is within a set range. A histogram of measured pulse heights is constructed. The number of interactions at a specific depth of interaction is extracted from the said histogram and calibration data. An energy spectrum is calculated from the said histogram and calibration data. The extracted photon depth and calculated energy spectrum are used in image reconstruction The invention and objects and features thereof will be more readily apparent from the following detailed description and appended claims when taken with the drawings.

DETAILED DESCRIPTION OF ILLUSTRATED EMBODIMENTS

Depth of interaction (DOI) information is needed for high resolution PET applications, such as organ-specific or small animal imaging, where, owing to the small system diameter and narrower crystal elements, more photons enter the scintillation crystal elements at oblique angles and penetrate into adjacent elements.

Many methods have been examined for extracting DOI information for high resolution PET applications. Among them, dual-ended readout provides continuous DOI information at the cost of doubling the number of photodetectors and processing channels.

An embodiment of the invention provides less complex, cost effective DOI detector technologies compatible with the current PET system detector designs used commercially, which employ photodetectors on only one end of the scintillation crystal array.

Figure 1:
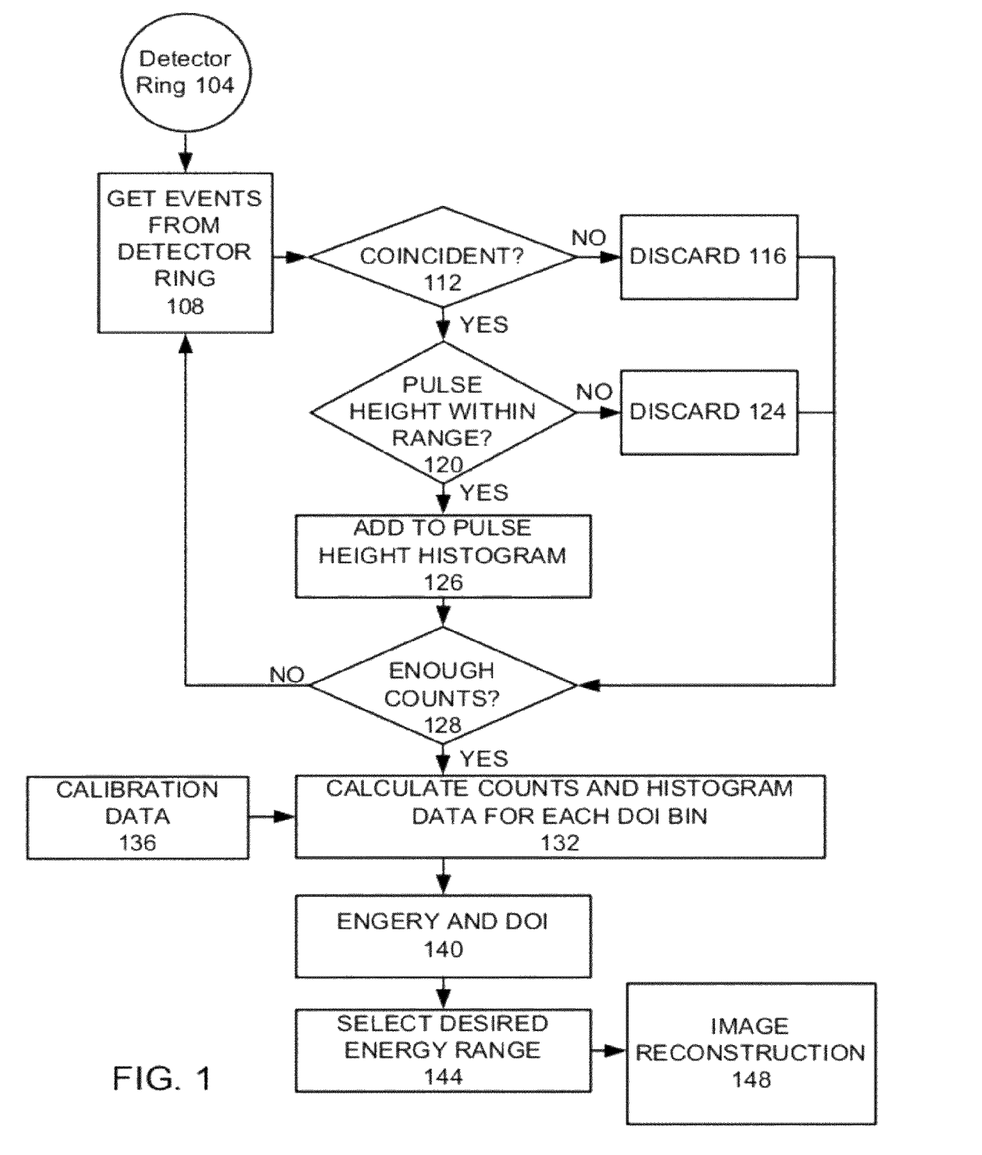
FIG. 1 is a high level flow chart of an embodiment of the invention that provides single ended readout DOI and energy using calibration data.

The basic concept is to modify the crystal elements such that the scintillation light collection at one end of the crystal is modulated by DOI. In an embodiment of the invention, the measured pulse height from the single-ended readout is proportional to DOI measured from the photon entrance end of the crystal element. FIG. 1 is a high level flow chart of an embodiment of the invention that provides single ended readout DOI and energy using calibration data. The light absorbing coating modulates pulse height based on photon DOI. Data events are collected from a detector ring 104 (step 108). A determination is made of whether an event is coincident with another event (step 112). If the event is not coincident, then the event is discarded (step 116). If event is coincident, a determination is made of whether the pulse height is within a set range (step 120). If the pulse height is not within the set range, the events are discarded (step 124). If the pulse height is within the set range the event is added to a pulse height histogram (step 126). If there are not enough counts (step 128) then additional events are received from the detector ring (step 108), and the cycle is repeated. If enough events have been recorded, then histogram data is generated calculating a global energy histogram and the DOI is binned to create a histogram (step 132), using calibration data 136, and which is used to provide photon energy and DOI 140. A desired energy range is selected (step 144). An image is reconstructed from the energy and DOI data (step 148).

Theory

In a dual-ended readout DOI detector, DOI is usually extracted from P1/(P1+P2), and energy is proportional to P1+P2 (see Equation 1), where P1 and P2 are pulse heights measured at the two ends of the crystal. By making P1+P2 constant, DOI becomes proportional to P1 only (P2 is not needed to extract DOI). In other words, in a single-ended readout configuration, pulse height P1 provides DOI information (Equation 1).

$$DOI \propto \frac{P_1}{P_1 + P_2};$$ (1)
$$P_1 + P_2 \equiv Const. \Rightarrow DOI \propto P_1$$

Based on this method, we expect to achieve acceptable DOI resolution performance to arrive at uniform reconstructed spatial resolution using photodetectors coupled to just one end of a scintillation crystal array.

Methods

Design Study

We used Monte-Carlo simulation to study the effect of crystal surface treatment and reflectors on DOI for single-ended light collection in individual crystals with dimensions of $1 \times 1 \times 20$ mm$^3$. We looked at the shift in 511 keV photopeak pulse height when DOI changes along the crystal.

Experimental Setup

Figure 2:
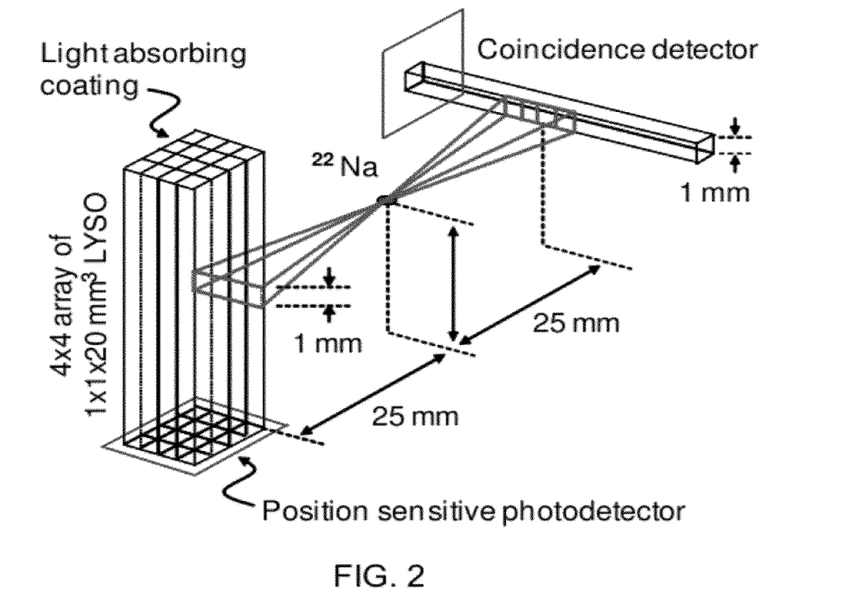
FIG. 2 shows a diagram of the detector setup used to generate a 1 mm thick coincident fan beam to irradiate the single-ended readout DOI crystal arrays at various depths.

We used position sensitive solid state photomultipliers (PS-SSPMs) (from RMD, Inc.) coupled to a $4 \times 4$ array of $1 \times 1 \times 20$ mm$^3$ LYSO with its top coated with light absorbing material to develop a high resolution DOI PET detector. Here, the PS-SSPM represent any kind of position sensitive photodetector (PSD). The PSD has an area of $5 \times 5$ mm$^2$, slightly larger than $4.5 \times 4.5$ mm$^2$ cross-section area of the PS-SPM. Electronic collimation with a 90° rotated detector was used to generate a 1 mm thick coincident fan beam to irradiate the crystal arrays at various depths, as shown in FIG. 2. In addition to scanning the DOI along the crystal length in coincident mode, we obtained single photon pulse height spectra by exposing the DOI detector from top (top exposure) and from bottom through the PSD (bottom exposure) with different photon energies for calibration.

Differential Positioning Method

Figure 3:
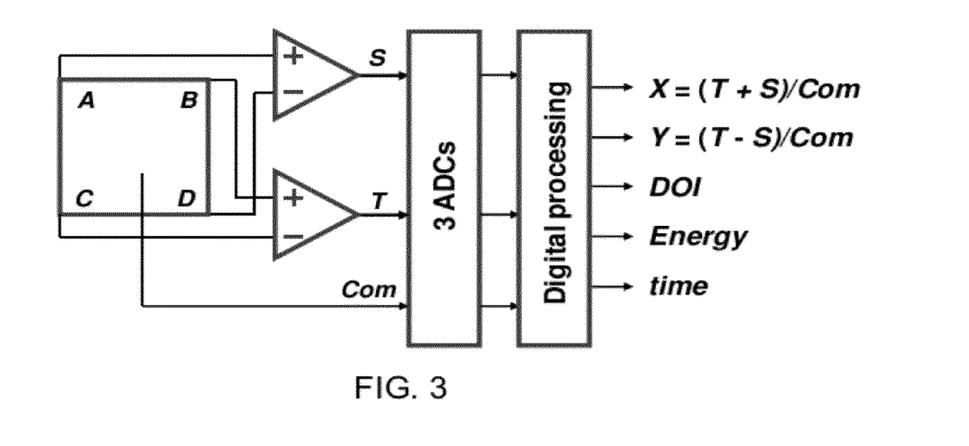
FIG. 3 is a schematic illustration of a circuit that may be used in an embodiment of the invention that subtracts diagonal signals.

By subtracting diagonal signals, we generated two differential positioning signals for each PSD. Therefore, instead of assigning 4 ADCs for signals A, B, C, and D, two ADCs are assigned to the two diagonally subtracted signals of S=A−D, and T=B−C. FIG. 3 is a schematic illustration of a circuit that may be used in an embodiment of the invention that subtracts diagonal signals. This novel method reduces the number of positioning ADCs by a factor of two (from 4 to 2) for a single or multiplexed position sensitive photodetectors.

Analog and Digital Processing

We used custom made pre-amps with low input impedance (6Ω) to couple PSD positioning signals to ORTEC 474 amplifiers and 433A sum & inverter modules for generating differential positioning signals S & T. Agilent Infiniium 90254A oscilloscope digitized and sampled waveforms at a fixed delay after the trigger point generated by the PSD common signal. Flood images were generated and crystal identification was performed based on segmentation of the flood images using minimum distance from positions of neighboring peaks.

Results and Discussion

Figure 4:
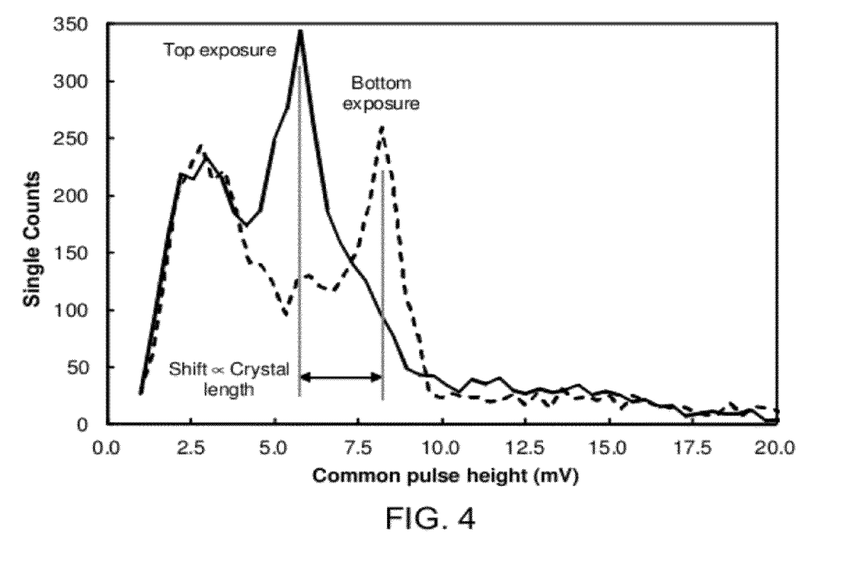
FIG. 4 illustrates pulse height histograms obtained when a crystal array is irradiated from top or bottom. The information is used as calibration data.
Figure 5:
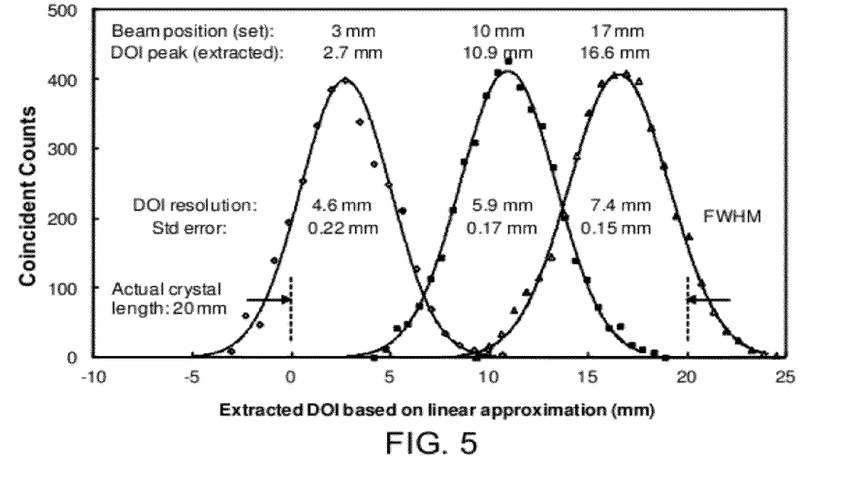
FIG. 5 is a graph of pulse height versus extracted DOI from one end of the crystal.
Figure 6A:
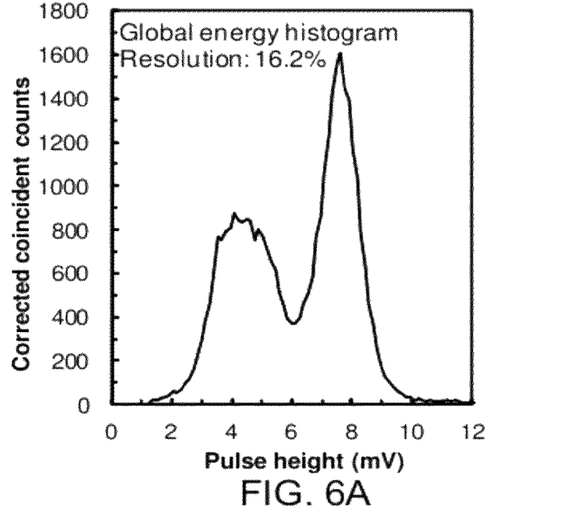
FIG. 6A is a graph of a corrected global energy histogram graphed from calibrated data and pulse height spectrum.
Figure 6B:
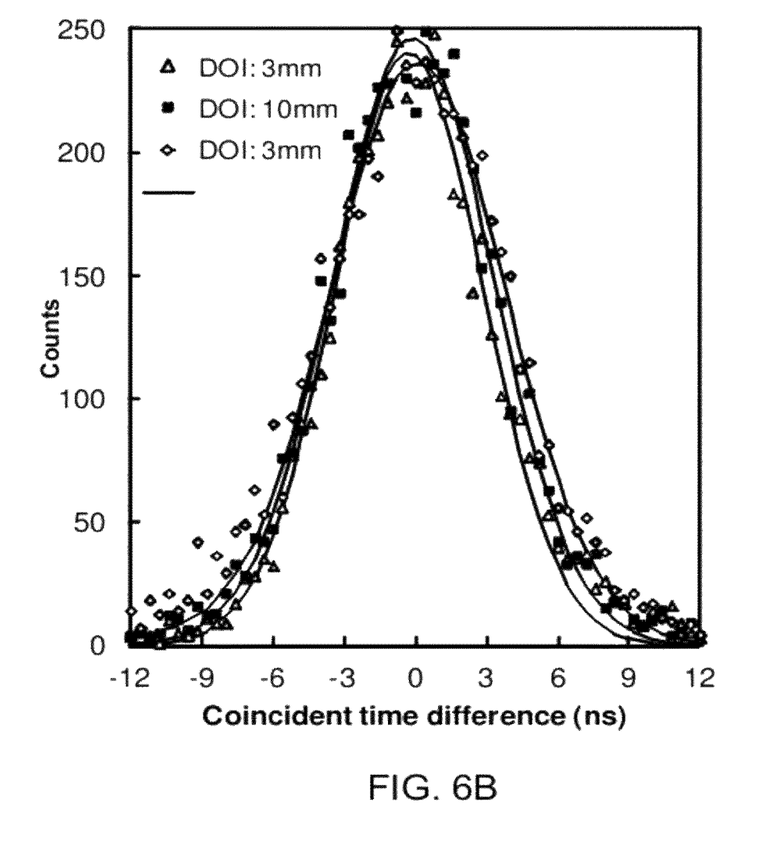
FIG. 6B shows a timing histogram used for detecting coincident events.

Results of detector calibration and measurements of depth of interaction (DOI) and energy resolution as well as time resolution are presented in FIGS. 4-6. In FIG. 4, crystal identification based on flood images (peak-to-valley ratio) obtained from $^{23}$Na using top and bottom exposure (covering the full DOI range) confirms the integrity of the differential positioning method with PSD and its relative invariability to DOI. FIG. 5 is a graph of pulse height versus extracted DOI from one end of the crystal. The 511 keV coincident photopeaks represent point spread function's (PSF's) for DOI. The established relationship is linear to within 10% over the 20 mm crystal length. DOI resolution is better at the top (photo entrance side) of the crystal because of the larger photopeak shift compared to at the bottom (photodetector end). Local energy resolution was measured to vary from 20.8% at the top to 14.6% at the bottom for a single-end readout DOI detector. A global energy spectrum was calculated from calibration data and pulse height spectrum (DOI) and graphed, as shown in FIG. 6A, showing resolution of 16.2%. FIG. 6B is a graph of corrected coincident counts versus pulse height used for detection of coincident events.

Figure 7:
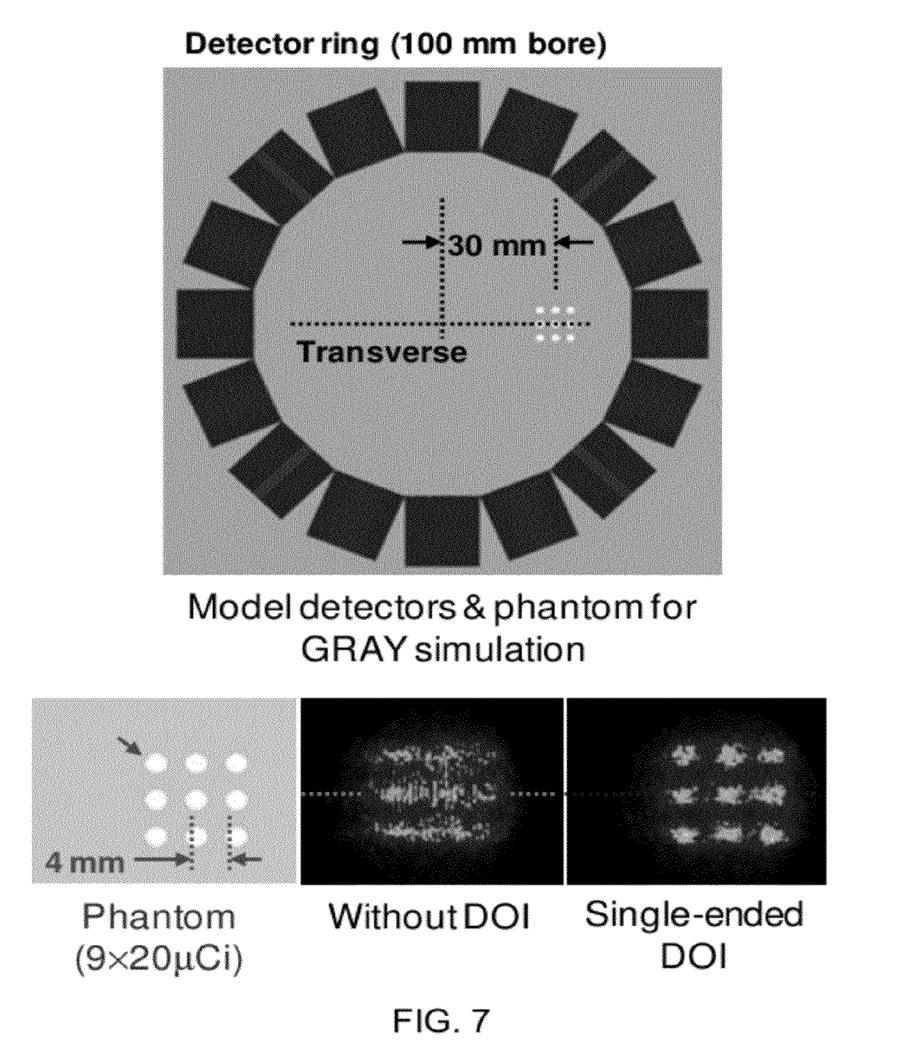
FIG. 7 illustrates simulation detectors arranged in a 10 cm bore diameter system, and how the image resolution is improved when single-ended DOI readout method is used.
Figure 8:
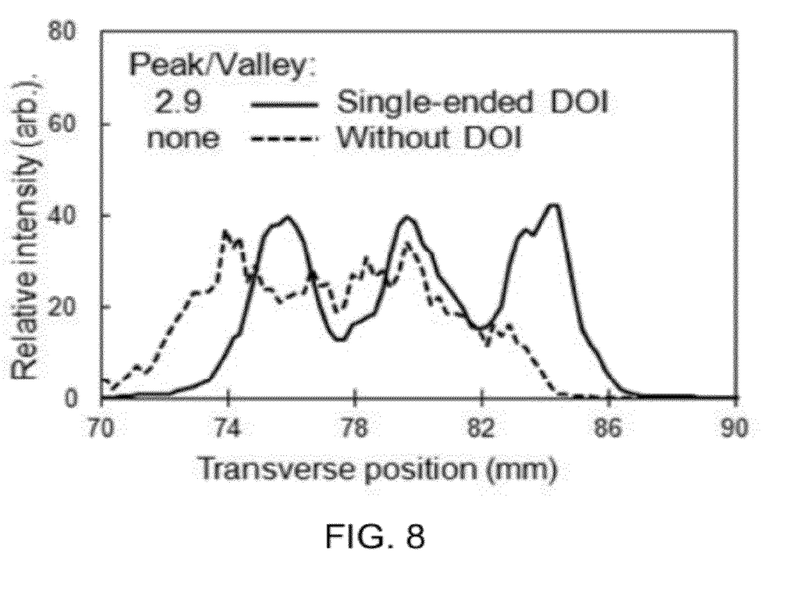
FIG. 8 is a graph of relative intensity versus position for a transverse profile.

Simulation detectors arranged in a 10 cm bore diameter system is illustrated in FIG. 7. The detector blocks consist of $1 \times 19$ arrays of $1 \times 1 \times 20$ mm$^3$ LYSO crystals. A $3 \times 3$ arrangement of 2 mm diameter hot spheres (20 µCi F-18) 4.0 mm apart, placed at 30 mm off the center of the field of view of the detector ring. FIG. 7 also illustrates the improvement provided by a single ended readout DOI correction. FIG. 8 is a graph of relative intensity versus position for a transverse profile quantifying how much the image resolution improves when single-ended DOI readout method is used according to the present invention. Peak-to valley ratios from the transverse and tangential profiles taken through a row of hot sphere image slices indicated that the single ended readout DOI method improves contrast resolution up to 110% compared to without-DOI detector for the simulated case. The single-ended readout DOI detectors presented in this invention showed to be able to resolve the 2 mm hot spheres in cold background off the center of the FOV.

Conclusion

Use of light absorbing coating on one end of scintillator crystals modulates the single-ended readout pulse height as a function of DOI. Results from FIG. 4 indicate we can resolve at least 3 distinct DOI levels. Implementing such DOI information in image reconstruction improves image spatial resolution. The single-ended DOI detector based on pulse height modulation is compatible with the standard PET detector configuration with the photodetectors on only one end of the crystal array, and provides a cost effective DOI solution for high resolution PET applications.

Specific Embodiments

Figure 9:
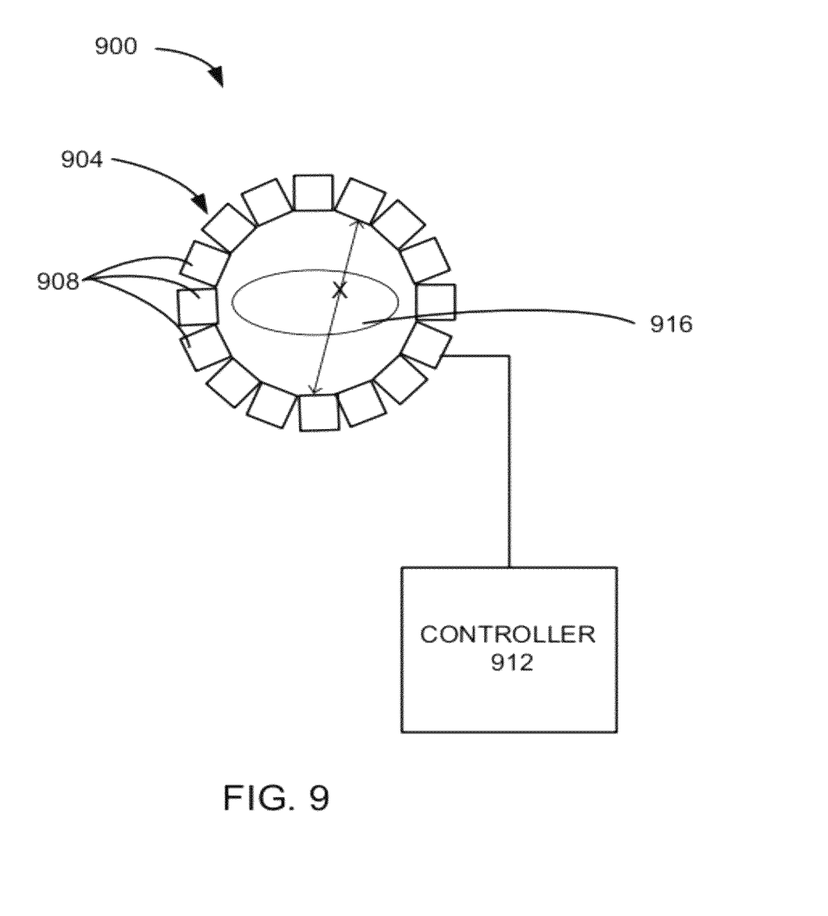
FIG. 9 is a schematic view of a PET system that may be used in an embodiment of the invention.

FIG. 9 is a schematic view of a PET system 900 that may be used in an embodiment of the invention. The PET system 900 comprises a detector ring 904 and a controller 912. The detector ring 904 comprises a plurality of detectors 908 formed in a ring. An object 916 is placed in an aperture of the detector ring 904. A positron emission at point X creates two gamma photons, which are detected by different detectors 908 of the detector ring 904. The event is recorded by the controller 912.

Figure 10:
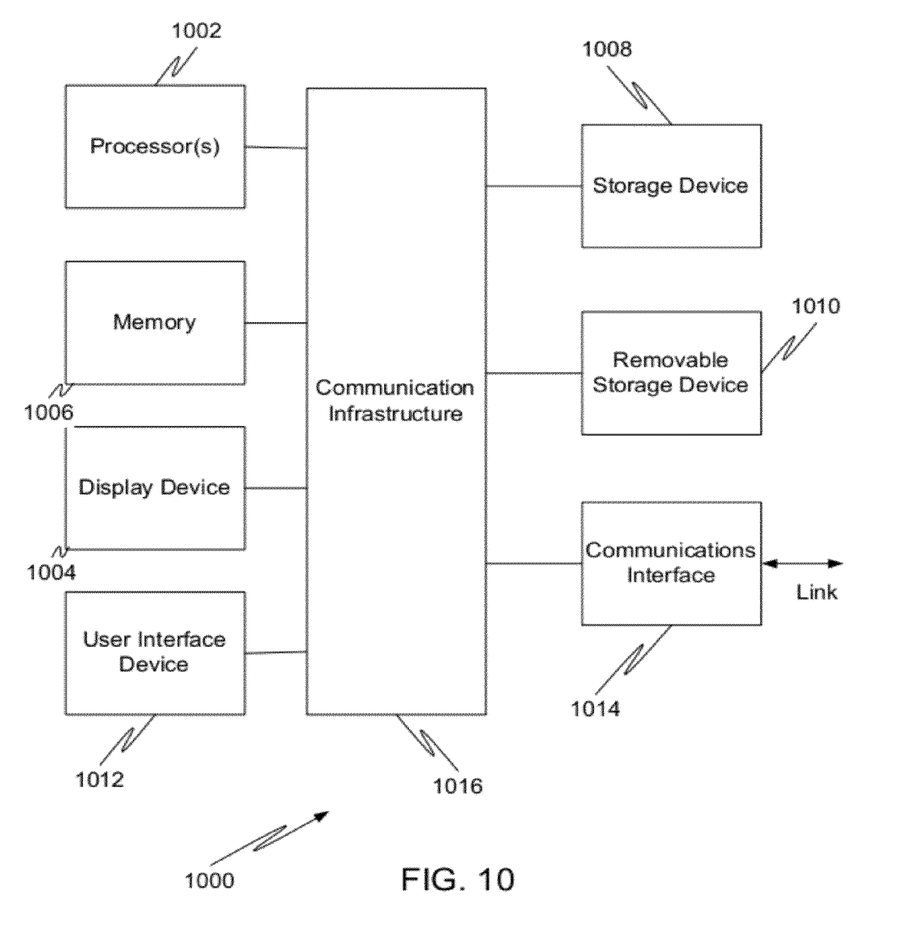
FIG. 10 is a high level block diagram showing a computer system, which is suitable for implementing a controller used in embodiments of the present invention.

FIG. 10 is a high level block diagram showing a computer system 1000, which is suitable for implementing a controller 912 used in embodiments of the present invention. The computer system may have many physical forms ranging from an integrated circuit, a printed circuit board, and a small handheld device up to a huge super computer. The computer system 1000 includes one or more processors 1002, and further can include an electronic display device 1004 (for displaying graphics, text, and other data), a main memory 1006 (e.g., random access memory (RAM)), storage device 1008 (e.g., hard disk drive), removable storage device 1010 (e.g., optical disk drive), user interface devices 1012 (e.g., keyboards, touch screens, keypads, mice or other pointing devices, etc.), and a communication interface 1014 (e.g., wireless network interface). The communication interface 1014 allows software and data to be transferred between the computer system 1000 and external devices via a link. The system may also include a communications infrastructure 1016 (e.g., a communications bus, cross-over bar, or network) to which the aforementioned devices/modules are connected.

Information transferred via communications interface 1014 may be in the form of signals such as electronic, electromagnetic, optical, or other signals capable of being received by communications interface 1014, via a communication link that carries signals and may be implemented using wire or cable, fiber optics, a phone line, a cellular phone link, a radio frequency link, and/or other communication channels. With such a communications interface, it is contemplated that the one or more processors 1002 might receive information from a network, or might output information to the network in the course of performing the above-described method steps. Furthermore, method embodiments of the present invention may execute solely upon the processors or may execute over a network such as the Internet in conjunction with remote processors that shares a portion of the processing.

The term "non-transient computer readable medium" is used generally to refer to media such as main memory, secondary memory, removable storage, and storage devices, such as hard disks, flash memory, disk drive memory, CD-ROM and other forms of persistent memory and shall not be construed to cover transitory subject matter, such as carrier waves or signals. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

Figure 11:
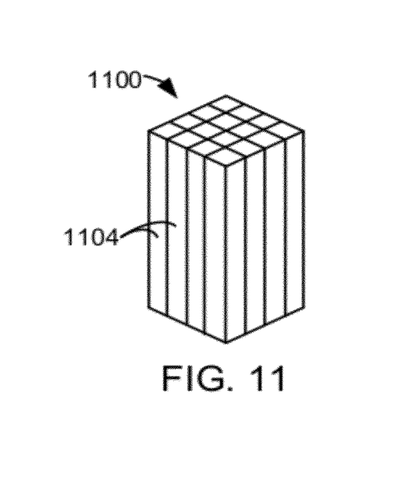
FIG. 11 is a more detailed view of a detector crystal array used in an embodiment of the invention.
Figure 12:
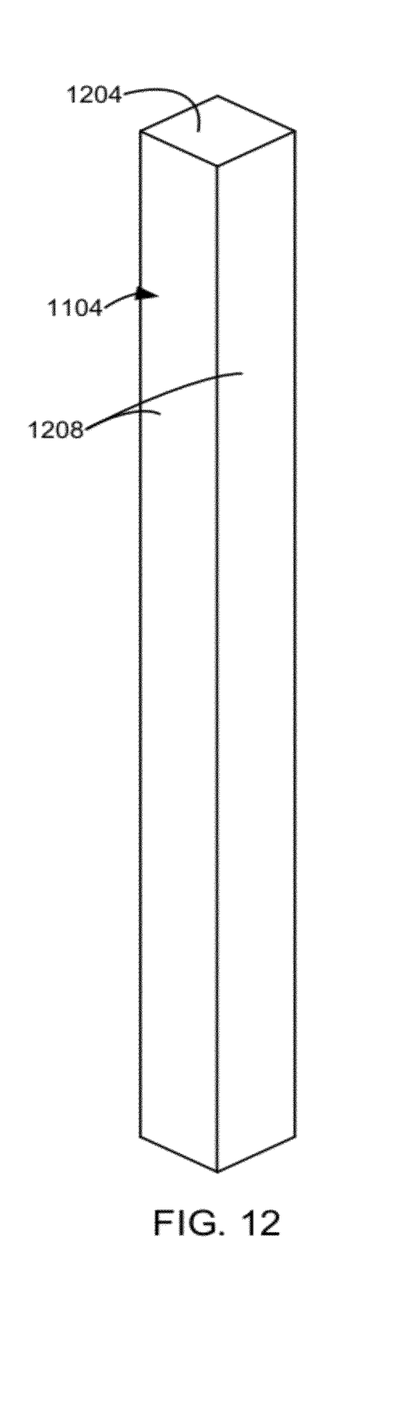
FIG. 12 is an enlarged view of a single crystal.
Figures 13, 14A, 14B, 14C:
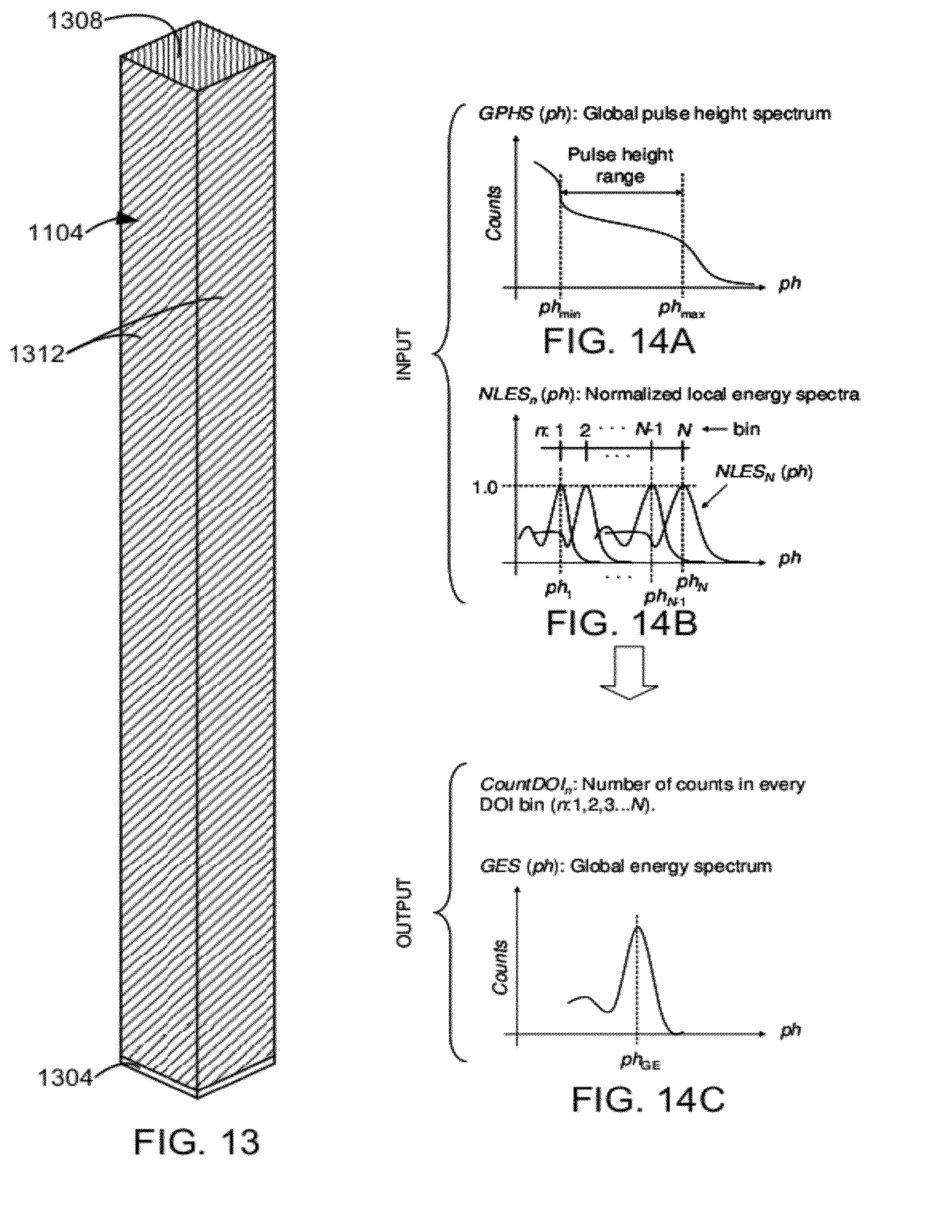
FIG. 13 is a view of the crystal, where one or more photodetectors are placed at the second end of the crystal, a light absorbing coating is placed at the first end of the crystal, and a reflective coating is placed on the sides of the crystal.
FIG. 14A shows an input graph of the global pulse height spectrum in this example.
FIG. 14B is a graph of NLES versus pulse height which are pre-calculated calibration data.
FIG. 14C is a graph of GES(ph) vs. $ph_n$, providing a global energy spectrum, and DOI.

FIG. 11 is a more detailed view of a detector crystal array 1100 used in an embodiment of the invention. In this embodiment the detector crystal array 1100 comprises 16 separate detector crystals 1104 formed in a 4×4 matrix. In this embodiment, each crystal is a LYSO crystal with a dimension of 1×1×20 mm³. FIG. 12 is an enlarged view of a single crystal 1104. The crystal has a length with a first end 1204 at one end of the length and a second end at the opposite end of the length. The crystal has four sides 1208 extending from the first end to the second end. FIG. 13 is a view of the crystal 1104, where one or more photodetectors 1304 are placed at the second end of the crystal 1104, a light absorbing coating 1308 is placed at the first end of the crystal 1104, and a reflective coating 1312 is placed on the sides of the crystal.

In this embodiment an object 916 is placed within the aperture of a detector ring 904. Positron emission creates gamma photos which are detected at the detectors 908. The events from the detector ring 904 are transmitted to the controller 912 (step 108). The controller determines if they are coincident (step 112) and discards events that are not coincident (step 116). FIG. 14A shows an input graph of the global pulse height spectrum in this example. In this embodiment preset values are set. A pulse height range is sent defining a maximum pulse height $ph_{max}$ and a minimum pulse height $ph_{min}$, as shown in FIG. 14A. For events that are not within the pulse height range (step 120), those events are discarded (step 124). Accepted events are used to construct a global pulse height spectrum (step 126) When enough events are counted (step 128, i.e., when a global pulse height spectrum of reasonable size is formed), histograms for local energy spectrum (LES) are calculated (step 132) with the help of calibration data which are normalized local energy spectra, NLES (step 136). FIG. 14B is a graph of NLES versus pulse height which are pre-calculated calibration data. One way of performing such calculation is using a recursive algorithm in which, a desired pulse height for the peak for the global energy spectrum is defined as $ph_{GE} \leftarrow 0.5 \, (ph_{max} + ph_{min})$. The global energy spectrum is then set to zero $GES(p) \leftarrow 0$. Starting from the last bin according to the upper end of the pulse height range n is set to N, $n \leftarrow N$. If n>0. The local energy spectrum is calculated, $LES_n(ph) \leftarrow GPHS(ph_n) \cdot NLES_n(ph)$. The counts for the DOI bin are calculated. Integration limits are chosen according to desired amount of scatter counts to be included, $CountDOI_n \leftarrow \int LES_n(ph) dph$. The local energy spectrum is scaled according to $ph_n$ and added to the global energy spectrum, $GES(ph) \leftarrow GES(ph) - LES(ph \cdot ph_{GE}/ph_n)$. The binned counts are removed from the global height spectrum $GPHS(ph) \leftarrow GPHS(ph) - LES_n(ph)$. Next n is decremented $n \leftarrow n-1$ to go to the next bin. The process is completed when all of the bins are counted. FIG. 14C is a graph of $GES(ph)$ vs. $ph_n$, providing a global energy spectrum, and DOI (step 140). A desired energy range is selected (step 144) using which other scattered events are filtered out. Then the counts in the DOI bins are used to reconstruct an image (step 148).

The method of calculating counts in every DOI bins and a global energy spectrum is only one representation of the concept of calculating counts in every DOI bins and a global energy spectrum using pulse height spectrum and pre-calculated calibration data. This should not limit the scope of the present invention to the specific method explained as an example.

Figure 15:
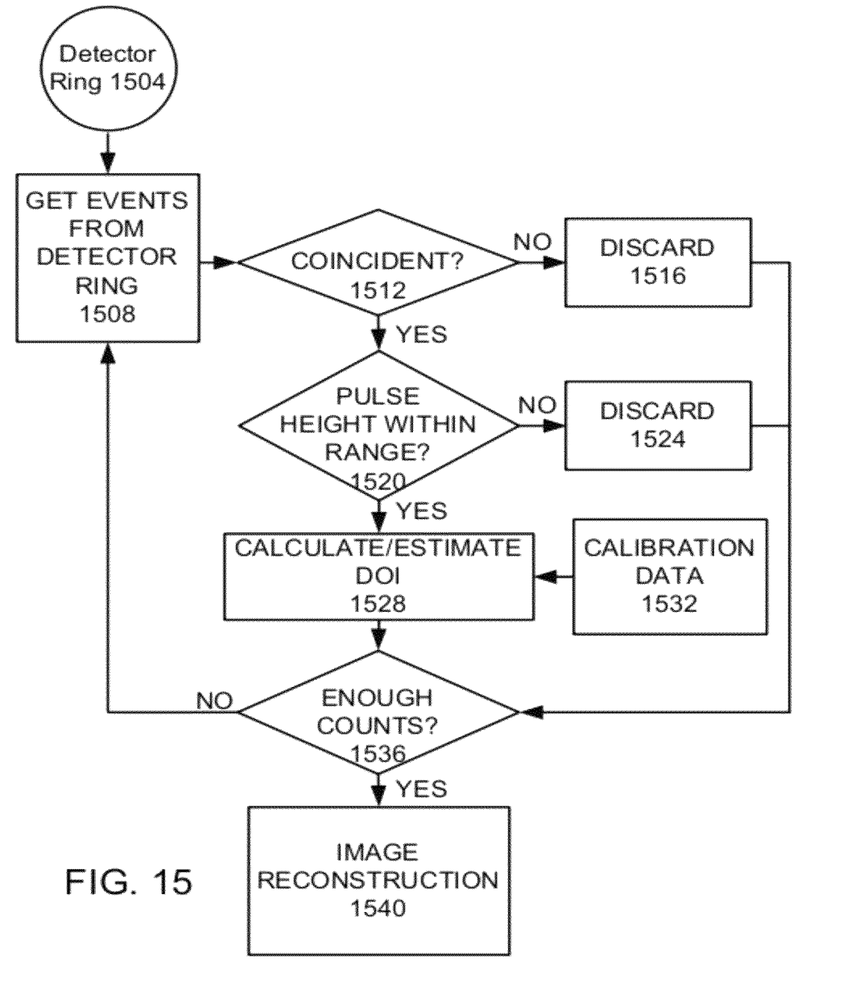
FIG. 15 shows another embodiment of the invention that converts pulse heights to DOI (as opposed to energy).

Another method that uses another embodiment of the invention, converts pulse heights to DOI (as opposed to energy), is shown in the high level flow chart of FIG. 15. Data events are collected from a detector ring 104 (step 1508). A determination is made of whether an event is coincident with another event (step 1512). If the event is not coincident, then the event is discarded (step 1516). If event is coincident, a determination is made of whether the pulse height is within a set range (step 1520). If the pulse height is not within the set range, the events are discarded (step 1524). If the pulse height is within the set range the DOI is calculated and/or estimated (step 1528) based on transfer/estimation functions obtained from calibration data (this method of filtering unwanted event provides a rough energy window). If there are not enough counts (step 1536) then additional events are received from the detector ring (step 1508), and the cycle is repeated until sufficient counts per each DOI bin are counted. If enough events have been recorded, then an image is reconstructed from the counts in DOI bins (step 1540).

By using DOI during image reconstruction, an embodiment of the invention provides improved image resolution.

Another embodiment of the invention uses a detector of scintillation crystals with a photodetector at a first end and a light absorbing coating at a second end opposite the first end. The embodiment of the invention is able to use such a crystal with a photodetector at only one end to determine DOI. Another embodiment of the invention is able to use the same detector to determine energy in addition to DOI. Such an embodiment has advantages over detectors which require photodetectors on opposite sides of the scintillation crystals to measure DOI, since such detectors increase cost of the detectors by requiring twice as many photodetectors and related hardware, provide a more complicated system. In addition, existing systems may be easily modified, simply by adding a light absorbing coating at the end of the scintillation crystals.

While this invention has been described in terms of several preferred embodiments, there are alterations, permutations, modifications and various substitute equivalents, which fall within the scope of this invention. It should also be noted that there are many alternative ways of implementing the methods and apparatuses of the present invention. It is therefore intended that the following appended claims be interpreted as including all such alterations, permutations, modifications, and various substitute equivalents as fall within the true spirit and scope of the present invention.

The invention claimd is:

1. A method for extracting photon depth of interaction information in a scintillator crystal of a positron emission tomography system, wherein the scintillator crystal has a rod-like shape with a length with a single photodetector at a first end of the length and a light absorbing coating at a second end of the length and a uniform reflective coating on sides of the scintillator crystal extending from the first end of the length to the second end of the length to optically isolate the scintillator crystal, comprising:
    detecting a single pulse in the photodetector;
    measuring a height of the said single pulse resulted from scintillation photons within the scintillator crystal;
    determining if said single pulse height is within a set range;
    extracting photon depth of interaction along the said length of the said rod-like crystal only from said single pulse height, wherein the scintillator crystal is optically isolated to prevent scintillation photons of other scintillator crystals from entering the scintillator crystal;
    calculating an energy of interaction within the scintillator crystal only from said pulse height and calibration data; and
    using the extracted photon depth and calculated energy spectrum in image reconstruction by the positron emission tomography system.

2. The method, as recited in claim 1, further comprising using the extracted depth of interaction to determine if the event is a coincident event for positron emission tomography (PET).

3. The method, as recited in claim 2, wherein the extracting the photon depth of interaction, comprises using data from a scintillation crystal with a light absorbing coating on a first end of the scintillation crystal.

4. The method, as recited in claim 3, wherein the extracting the photon depth of interaction further comprises calculating the depth of interaction as being proportional to pulse height of a photodetector.

5. The method, as recited in claim 3, further comprising:
    constructing a histogram of measured pulsed heights; and
    receiving calibration data, wherein the calculating the energy of interaction comprises using the histogram of measured pulsed heights and calibration data to determine energy of interaction.

6. A method for extracting photon depth of interaction information in a scintillator crystal of a positron emission tomography system, wherein the scintillator crystal has a rod-like shape with a length with a single photodetector at a first end of the length and a light absorbing coating at a second end of the length and a uniform reflective coating on sides of the scintillator crystal extending from the first end of the length to the second end of the length to optically isolate the scintillator crystal comprising:
    detecting a single pulse in a photodetector;
    measuring only a height of said single pulse resulted from scintillation photons within the scintillator crystal only;
    determining if said pulse height is within a set range;
    constructing a histogram of said measured pulse heights;
    extracting the number of interactions at a specific depth of interaction along the said length of the crystal from the said histogram and calibration data;
    calculating an energy spectrum from the said histogram and calibration data; and
    using the extracted photon depth and calculated energy spectrum in image reconstruction.

7. The method, as recited in claim 6, further comprising using the extracted depth of interaction to determine if the event is a coincident event.

8. The method, as recited in claim 7, wherein the extracting the photon depth of interaction further comprises calculating the depth of interaction as being proportional to pulse height of a photodetector.

9. A depth of interaction detector for a positron emission tomography system, comprising:
    an array of individual rod-like scintillator crystals wherein each individual scintillator crystal has a length with two ends, and a reflective coating on its sides uniformly extended from one end to the other end that optically isolate each individual scintillator crystal from neighboring crystals, and a light absorbing coating on one end, and
    an array of photodetectors on the other end, opposite the light absorbing end, wherein the depth of interaction of a scintillation event inside an individual crystal is extracted only from a single pulse height.

10. The detector, as recited in claim 9, wherein the individual scintillator crystals comprises a reflective coating on sides of the individual scintillator crystals, wherein the reflective coating optically isolates the individual scintillator crystals from each other.

11. The detector, as recited in claim 10, wherein the scintillator crystals are rod-like crystal elements that have equal or less than 1.5 millimeter width.

12. The detector, as recited in claim 10, wherein the scintillator crystals produce scintillation photons, wherein the light absorbing coating absorbs the scintillation photons.

* * * * *